G. L. BURNHAM.

Manufactucture of Flexible Gas-Tubing.

No. 133,560.                                   Patented Dec. 3, 1872.

WITNESSES.                                                     INVENTOR.

H. H. Richardson

Benj. M. Bosworth Jr.

Geo. L. Burnham

UNITED STATES PATENT OFFICE.

GEORGE L. BURNHAM, OF PROVIDENCE, RHODE ISLAND.

IMPROVEMENT IN THE MANUFACTURE OF FLEXIBLE GAS-TUBING.

Specification forming part of Letters Patent No. 133,560, dated December 3, 1872.

*To all whom it may concern:*

Be it known that I, GEORGE L. BURNHAM, of the city and county of Providence, in the State of Rhode Island, have invented a certain Improvement in Flexible Gas-Tubing, of which the following is a specification:

In the accompanying drawing like letters indicate like parts.

Figure 1:
Figure 2:
Figure 3:
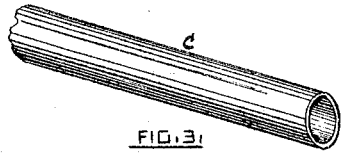
Figure 4:

Figure 1 shows my flexible tubing with the stem covering. Fig. 2 is a section of the same, showing the several layers. Fig. 3 is a perspective view of the kelp-stem. Fig. 4 shows my flexible tubing with the leaf covering.

The purpose of my invention is to construct a flexible tube, suitable for conveying illuminating and other gases without leakage.

This object has heretofore been accomplished by woven tubes coated with various preparations or covered with animal intestines or similar tissues, or by other well-known devices more or less valuable.

My invention consists in the use and application of an entirely new material for this purpose, which is much cheaper than materials now used and is perfectly impervious to gases.

The kelp, a common and well-known variety of sea-weed, which is found in large quantities upon our sea-coasts, furnishes a material, which, when properly prepared, is available for the purpose above named.

This marine plant has a hollow stem of great length and a long leaf, both of a tough and firm texture, and both (as I have discovered) valuable in the manufacture of tubing.

The plant requires curing in order that it may be kept moist and pliable. This I accomplish by soaking the stem in a mixture of glycerine and carbolic acid, in about equal quantities, and keeping it in said mixture for a considerable length of time, until it becomes saturated with the composition. I prefer to continue this process for four days, though a less time may be sufficient. The glycerine entering into and filling the pores of the plant, makes it soft and yielding and keeps it in that condition, while the carbolic acid shrivels and toughens the fiber and renders the texture of the plant more compact.

In curing the leaf I first soak it in fresh water, whereupon it can be easily split into two thin layers throughout its entire length. These strips I afterward immerse in said mixture and cure in the same manner as the stem. The kelp is then ready for use in the manufacture of the tubing.

My tube, as shown in the accompanying drawing, is constructed precisely as gas-tubing has been made heretofore.

The spiral spring A is covered by the woven fabric B, making the foundation of the tube and giving it strength and sufficient stiffness. The kelp stem C is drawn upon the tube so formed, by "sleeve-friction," incasing and firmly embracing the tube and rendering it perfectly impervious to gas. Over the whole are then braided the covering D and the woolen finish E. The tube is then properly tipped and mounted and is ready for use.

If, instead of the stem, the kelp leaf is used it is wrapped about the tube A B, as shown in Fig. 4 at F, and covered by the braids D and E as aforesaid.

The overlapping leaf forms a joint perfectly gas-tight, and is kept in necessary contact with the first fold of the leaf by the pressure of the braids which inclose it.

Although a single stem or layer of leaf is sufficient for the purposes sought, other stems or layers may be drawn or wrapped upon them, as may be desired. By this contrivance short pieces of the stem are available, and, by overlapping the ends, a perfect joint is formed; or in piecing the stems one or more layers of the leaf will make the necessary joint.

The stem or leaf may be cured after it has been placed upon the tube; but in general the first-named method is preferable.

It is obviously within my invention if the tube so formed be used as hose or conductors of other fluids than gas, as also that other varieties of marine plants or sea-weed of similar fiber and texture may be used instead of kelp.

What I claim as my invention, and desire to secure by Letters Patent, is—

1. The method of curing kelp or other marine plants by means of glycerine and carbolic acid, as and for the purpose specified.

2. The use of kelp or other marine plants, in the manufacture of flexible tubing or conductors of illuminating or other gases or fluids, substantially as described.

GEO. L. BURNHAM.

Witnesses:
H. H. RICHARDSON,
BENJ. M. BOSWORTH, Jr.